March 17, 1953 G. A. TINNERMAN 2,631,634
NUT ANCHORING DEVICE
Original Filed May 22, 1947
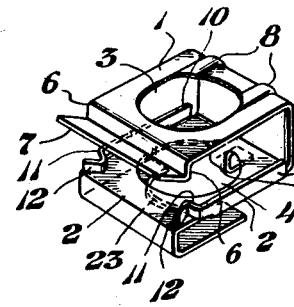
Fig.1.
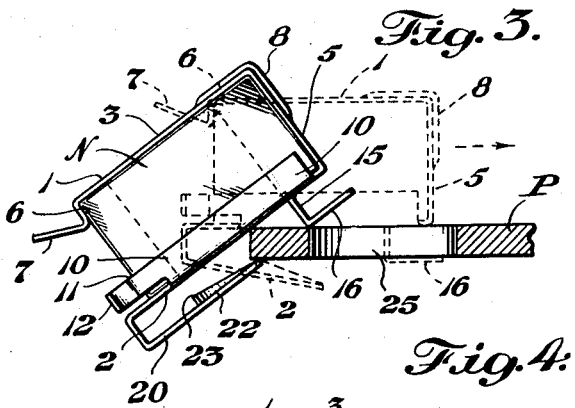
Fig.3.
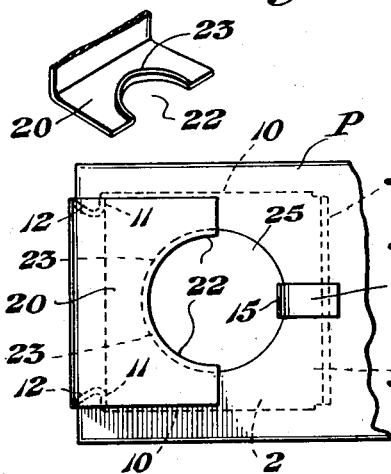
Fig.2.
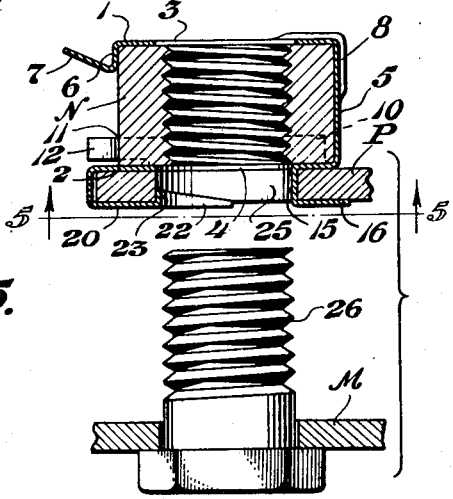
Fig.4.
Fig.5.
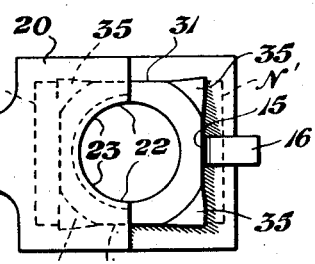
Fig.7.
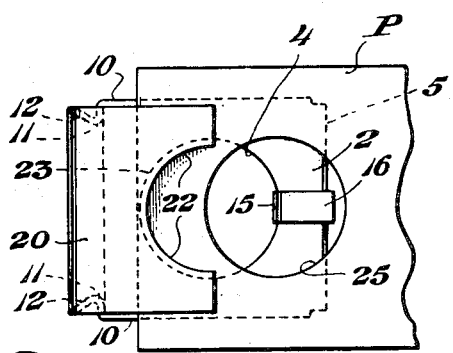
Fig.6.
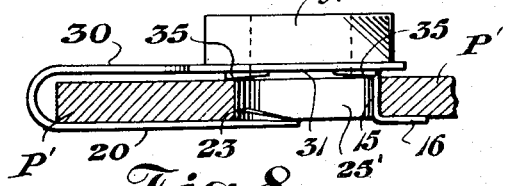
Fig.8.
Inventor
George A. Tinnerman,
H. G. Lombard
Attorney Patented Mar. 17, 1953

2,631,634

UNITED STATES PATENT OFFICE 2,631,634

NUT ANCHORING DEVICE

George A. Tinnerman, Cleveland, Ohio, assignor to Tinnerman Products, Inc., Cleveland, Ohio, a corporation of Ohio Original application May 22, 1947, Serial No. 749,757. Divided and this application April 5, 1951, Serial No. 219,491

2 Claims. (Cl. 151—41.75)

This invention relates in general to nut fastened installations and deals, more particularly, with improvements in nut holding devices for attaching standard nuts, tapped plates, and the like, in fastening position in an assembly prior to the application of a cooperating bolt or similar fastener thereto for securing the parts of the installation. This application is a division of prior copending application Serial Number 749,757 filed May 22, 1947 and now Patent 2,552,499 issued May 8, 1951.

In many assemblies, it is necessary or desirable to use a standard nut and bolt fastening means but it is usually a difficult problem, especially in blind locations, for the operator to hold the nut in place as the bolt is applied, or otherwise, to maintain the nut against rotation during the final tightening of the bolt therewith. In most assemblies in which the rearward side of a part is not conveniently or readily accessible for holding a nut in fastening position prior to application of the bolt, it is necessary to resort to some form of riveting, welding or other attaching means for retaining the nut in fastening position.

In the average installation requiring a cheap, inexpensive nut holding means, the cost of welding, or riveting clinch-on nut holding devices, and the like, generally is so expensive as to make the use thereof prohibitive. Similarly, sheet metal, cage type of nut holding devices heretofore available are objectionably expensive and complicated, and otherwise disadvantageous in requiring an entirely inordinate amount of time for attaching the same in fastening position in an installation.

A primary object of the present invention, therefore, is to provide an improved sheet metal nut holder or retainer which is relatively simple and inexpensive to manufacture and includes in its construction a simplified, easily and quickly applied clip type of attaching means in the form of a pair of cooperating spring arms adapted to clasp a part adjacent a bolt opening therein to hold the nut in attached fastening position over said bolt opening, together with an auxiliary supporting hook adapted to engage a marginal portion of the bolt opening to reinforce and rigidify the nut holder in such attached fastening position.

A further object of the invention is to provide a nut holder of this character comprising a pair of arms for embracing the apertured part to which the nut is to be attached, together with means on one of said arms adapted to lock the nut holder in attached fastening position in conjunction with the said auxiliary supporting hook.

Another object of the invention is to provide a nut holder such as described in which the locking means on one of the arms of the nut holder is designed to serve also as a locating or positioning element for guiding the nut holder in the application thereof to attached fastening position.

Further objects and advantages and other new and useful features in the construction, arrangement and general combination of parts of the invention will be readily apparent as the following description proceeds with reference to the accompanying drawings, for purposes of illustration but not of limitation, in which like reference characters designate like parts throughout, and in which:

Figure 1 is a perspective view of one form of the improved nut holder;

Figure 2 is a fragmentary perspective view showing the construction of the locating and locking detent on the attaching arm of the nut holder represented in Figure 1;

Figure 3 is a side elevational view of an assembled nut and nut holder as initially applied to attach the same to an apertured part, and with the subsequent position thereof substantially as represented in dotted lines;

Figure 4 is a sectional view showing the assembled nut and nut holder in final attached position with a bolt about to be applied thereto to complete a fastening installation;

Figure 5 is a sectional view taken on line 5—5 of Figure 4 looking in the direction of the arrows; and, Figure 6 is a view looking from the underside of Figure 3 showing the application of the nut holder in substantially the position illustrated in dotted lines in Figure 3.

Figure 7 is a bottom plan view of another form of nut holder embodying an attaching arm and auxiliary supporting hook construction similar to the nut holder shown in Figures 1-6 inclusive; and, Figure 8 is a sectional view showing the nut holder of Figure 7 in attached position on an apertured part.

Generally speaking, a nut holder constructed in accordance with the present invention is best provided from any suitable sheet metal strip material, preferably tempered spring metal or cold rolled metal having spring-like characteristics. The nut holding portion of the device may be provided in various forms to accommodate any selected type of nut, together with an improved attaching means including an attaching arm, or the like and an auxiliary supporting hook. Preferably the attaching arm is provided with a locking detent serving as an indexing or positioning means together with an adjacent sight opening which advantageously facilitates application of the nut holder to the attached fastening position of the nut carried thereby.

Referring now, more particularly, to the drawings, Figure 1 shows one form of the improved nut holder in which a sheet metal strip is bent into a substantial S-shape to define a pair of cooperating nut holding arms comprising a top arm 1 and an intermediate arm or base 2 having aligned bolt passages 3, 4, respectively. Said nut holding arms 1, 2, are spaced by a connecting portion or web 5 and are designed to hold, in frictionally and grippingly assembled relation therebetween, any selected form of nut, N, Figure 4.

In the present example, a standard square nut N is shown retained in clamped relation between the arms 1, 2, and is held against endwise displacement or removal from between said arms by a downwardly bent end flange or shoulder 6 engaging the adjacent outer end face of the nut. Preferably an upwardly flared tongue or guide surface 7 is provided on the extremity of said arm 1 in order to facilitate the initial application of the nut to clamped relation between said arms 1, 2, as aforesaid. In order to rigidify the arm 1 in such clamped relation with the nut, strengthening ribs 8 are provided at the junction of said arm with the adjacent connecting or web portion 5.

On the lower arm 2, there are provided upturned flanges 10 that are partially severed from said arm 2 to define nut retaining fingers having free ends which are bent to form inwardly extending shoulders 11 which engage the outer end face of the nut in cooperation with the flange or shoulder 6 on arm 1. Preferably the free ends of said fingers are provided with outwardly flaring yieldable guide surfaces 12 which facilitate the application of the nut to assembled relation with the nut holder. In an alternate construction similar side flanges 10 and fingers 11 may be provided on the top arm 1 of the nut holder with or without those on the arm 2, just described.

The arrangement of the arms 1, 2, of the nut holder otherwise is such that the nut N is readily snapped therebetween to a position in which the thread opening in the nut is aligned with the bolt passages 3, 4, in said arms, as best seen in Figure 4. In such assembled relation, the shoulder 6 on the top arm 1 and the shoulders 11 on the side flanges 10 engage the outer end face of the nut, the flanges 10 engage the side faces thereof, and the web 5 engages the opposite end face of the nut to retain the same in assembled relation with the nut holder and prevent turning of the nut when a cooperating bolt is applied thereto and rotated in tightened fastening position. Assembly of the nut with the nut holder is facilitated by the outwardly tapered guide surface 7 on the top arm 1 in that the end face of the nut on being initially applied engages said guide surface in a camming action to cause the same to spread apart from the arm or base 2 as necessary to admit the nut between said arms to the assembled relation of the nut with the nut holder, whereupon the shoulder 6 snaps into engagement with the adjacent face of the nut. Similarly, in the initial application of the nut to assembled relation with the nut holder, the guide surfaces 12 on the side flanges 10 are cammed apart as necessary to permit the shoulders 11 to snap into retaining relation with the nut in cooperation with the shoulder 6 on the top arm 1 of the nut holder, as aforesaid.

In providing the bolt passage 4 in the arm 2 of the nut holder, the metal in this area is cut out except for an integral strip which is bent at the periphery of the bolt passage to form a shouldered hook 16 including a shoulder 15, Figure 4, extending in underlying relation to the arm 2 and spaced therefrom a distance approximating the thickness of the part to which the nut holder is to be attached. The hook 16 is suitably designed in the completed nut holder to pass through the bolt aperture 25 in the supporting part P, as illustrated in dotted lines in Figure 3, and to cooperate with the attaching arm 20 of the nut holder in supporting the nut holder on said part at spaced points, as seen in Figure 4, so that the attachment of the nut holder to the supporting part is one of high strength and rigidity.

The attaching arm 20 of the nut holder is formed by a generally U-shaped return bend of an end portion on the intermediate arm or base 2 and terminates substantially below the bolt passage 4 therein. As best seen in Figure 2, the extremity of the attaching arm 20 is recessed in a manner to define a suitable sight opening 22 and an adjacent locking projection or detent 23. Preferably, said detent 23 is formed from a marginal edge portion of the sight opening 22 to define a generally semicircular indexing or positioning element which snugly engages the periphery of a bolt opening in a part to retain the assembled nut and nut holder in attached position thereon. The locking detent 23 preferably has its upper edge surface tapered generally downwardly and outwardly toward the free end of arm 20 to define an inclined cam surface which provides a flared opening between said arm 20 and the cooperating intermediate arm or base 2.

As best seen in Figures 3 and 4, with the assembled nut and nut holder provided substantially as aforesaid, the attaching arm 20 is adapted to be applied over an edge of part P to a position in which the nut holder retains the nut N in registration with the bolt opening 25 in said part. In the initial application of the nut holder, as seen in Figure 3, the hook 16 passes over the part P on the side opposite to that at which the attaching arm 20 is disposed, and as the nut holder is pushed to the position represented in dotted lines, said hook 16 is received in the bolt opening 25 and is adapted to extend therethrough to the same side of the part P which is engaged by the attaching arm 20. Thus, when the nut holder is pushed to its fully attached position, shown in Figure 4, the hook 16 engages the marginal portion of part P adjacent the bolt opening 25 and cooperates with the attaching arm 20 in supporting the nut holder in fully attached position.

Preferably, the normal spacing of the resilient attaching arm 20 from cooperating intermediate arm 2 is somewhat less than the thickness of part P such that said attaching arm 20 must be spread slightly outwardly over the edge of said part. The nut holder is then pushed to the position represented in dotted lines in Figure 3, and in Figure 6, and finally to fully attached fastening position in which the arm 2 and attaching arm 20 resiliently clasp said part, as represented in Figure 4. In this respect, the inclined cam surface of the locking detent 23 defines a flared entrance at the leading end of the attaching arm 20 which facilitates the initial application thereof to part P by causing a gradual outward camming of said arm as necessary to clear the edge of the part easily and quickly. In such initially applied position, as shown in plan in Figure 6, the sight opening 22 on the attaching arm 20 leaves the bolt passage 25 in part P uncovered and fully visible such that the attaching arm of the nut holder may be guided readily, in the least amount of time and effort, to the proper attaching position in which the locking detent 23 thereon will snap into said bolt opening 25 in the final applied fastening position of the nut on said part P, substantially as shown in Figures 4 and 5. The locking detent 23 is preferably semicircular, and thereby snugly engages a material edge portion of the circular bolt opening 25, as best seen in Figure 5, to lock the nut holder in fully attached position, while otherwise leaving a sufficiently large passage for receiving any suitable bolt fastener 26, Figure 4, to be applied to the nut N to secure a member M to said part P in a completed fastening installation.

The nut holder is applied to attached fastening position and functions in such attached fastening position substantially in the manner described whether the nut N is preassembled therewith or snapped into assembled relation with the nut holder after the nut holder has been first attached to the supporting part P, as aforesaid.

In any form of the invention, it will be appreciated that in the fully attached position of the nut holder, the shoulder 15, Figure 4, on the supporting hook 16 rigidly abuts a marginal portion of the bolt opening 25 to prevent shifting of the nut holder over said opening while the hook 16 grippingly engages the part P adjacent said opening in cooperation with the attaching arm 20. The nut holder is thus secured over the bolt opening at spaced points which provides an exceptionally strong attachment. The hook 16 otherwise removes any tendency toward displacement of the nut and nut carrying arm or base 2 from attached fastening position as a result of possible hinging of said nut carrying arm 2 away from the part P, as might be the case when the attaching arm 20 only is employed without the benefit of said supporting hook 16. In addition, the detent 23, on the attaching arm 20 serves to lock the nut holder in attached position, as aforesaid, and accordingly, the various described securing and attaching elements all cooperate in providing an improved, highly practical nut holder which may be attached in a minimum of time and effort to provide a strong, durable and locked installation of the nut and nut holder in attached position on the part to be secured.

Figures 7 and 8 show a further form of the invention in which the nut holder embodies an attaching arm 20 and auxiliary supporting hook 16 which are generally similar in construction, application and use to that described with reference to Figures 1-6 inclusive. The attaching arm 20 and the cooperating nut carrying arm 30 may be made as long as necessary in order that the nut N' may be positioned over a bolt opening 25' a relatively greater distance inwardly of the edge of the panel P'. Adjacent the connected portions of said arms, the width of the strip is reduced so that the flexibility of said arms is increased in order to facilitate the application of the nut holder to attached fastening position. The nut N' may be of any type which is riveted, welded or similarly attached over a suitable opening in the nut supporting arm 30. In the present example, the nut carrying arm 30 is provided with a rectangular opening 31 and the nut N' is of standard rectangular design having on its underface projecting lugs 35 which are so spaced and designed as to be received within said opening 31 in snug engagement with the corner recesses thereof so that turning of the nut in said opening is prevented. The lugs 35 are peened or otherwise deformed so as to overlap the adjacent marginal portion of said opening 31 and thereby firmly and rigidly unite the nut N' to the nut carrying arm 30. The auxiliary supporting hook 16 is formed from an integral tongue or strip portion which is provided for in the cutout which is made in forming the opening 31 in the nut carrying arm 30 and this strip is bent to define the required auxiliary supporting hook 16. The completed nut holder shown in Figures 7 and 8, accordingly, embodies the same general attaching features as that described with reference to Figures 1-6 inclusive and is adapted for application and use in the same general manner.

While the invention has been described in detail with specific examples, such examples are intended as illustrations only inasmuch as the invention fully contemplates various modifications which may be provided without departing from the spirit and scope of the invention.

What is claimed is:

1. A fastener comprising a sheet metal body bent to provide a pair of arms having free ends and extending in the same general direction for clasping an apertured part therebetween to hold the fastener in fastening position on said part, one of said arms being an attaching arm for engaging said part adjacent the aperture therein, the other arm being a nut carrying arm provided with an opening and a preformed hook defined by a strip having a junction with the edge of said opening nearest the free end of said nut carrying arm, said strip being provided from the material of said nut carrying arm inside the periphery of said opening therein, a portion of said strip adjoining said junction being bent to depend from said junction below said nut carrying arm and substantially in line with the edge of said opening from which it depends, the remaining portion of said strip being bent to extend in spaced relation to said nut carrying arm and outwardly in the same general direction as said attaching arm for engaging a marginal portion of the aperture in said part in cooperation with said attaching arm, a nut on said nut carrying arm, said nut having its entire underface in substantially a single plane and provided with spaced lugs projecting from said underface of the nut a distance slightly greater than the thickness of said nut carrying arm, said underface of the nut being seated on the outer surface of said nut carrying arm over said opening therein with only said spaced lugs extending into said opening, said spaced lugs including a pair of spaced lugs at opposite sides of said preformed hook and in spaced relation to said hook, said spaced lugs being deformed in said opening to anchor the nut on said nut carrying arm with said spaced lugs substantially flush with the inner surface of said nut carrying arm and with said hook extending completely clear of the nut.

2. A fastener comprising a sheet metal body bent to provide a pair of arms having free ends and extending in the same general direction for clasping an apertured part therebetween to hold the fastener in fastening position on said part, one of said arms being an attaching arm for engaging said part adjacent the aperture therein and including a projection receivable in said aperture to lock the fastener in attached position, the other arm being a nut carrying arm provided with a rectangular opening having opposite straight edges extending generally transversely of said nut carrying arm, a preformed hook defined by a strip having a junction with the mid-portion of the transversely extending straight edge of said rectangular opening nearest the free end of said nut carrying arm, said strip being provided from the material of said nut carrying arm inside the periphery of said rectangular opening therein, a portion of said strip adjoining said junction being bent to depend from said junction below said nut carrying arm and substantially in line with said transversely extending straight edge of said rectangular opening from which it depends, the remaining portion of said strip being bent to extend in spaced relation to said nut carrying arm and outwardly in the same general direction as said attaching arm for engaging a marginal portion of the aperture in said part in cooperation with said attaching arm and said projection thereon, a nut on said nut carrying arm, said nut having its entire underface in substantially a single plane and provided with spaced lugs projecting from said underface of the nut a distance slightly greater than the thickness of said nut carrying arm, said underface of the nut being seated on the outer surface of said nut carrying arm over said rectangular opening therein with only said spaced lugs extending into said rectangular opening, said spaced lugs being positioned in the corners of said rectangular opening and including a pair of spaced lugs at opposite sides of said preformed hook and in spaced relation to said hook, said spaced lugs being deformed in said corners of said rectangular opening to anchor the nut on said nut carrying arm with said spaced lugs substantially flush with the inner surface of said nut carrying arm and with said hook extending completely clear of said nut.

GEORGE A. TINNERMAN.

REFERENCES CITED

The following references are of record in the file of this patent:

UNITED STATES PATENTS

| Number | Name | Date |
|---|---|---|
| 2,079,917 | Mitchel | May 11, 1937 |
| 2,274,014 | Tinnerman | Feb. 24, 1942 |
| 2,278,790 | Langmaid | Apr. 7, 1942 |
| 2,552,499 | Tinnerman | May 8, 1951 |